United States Patent
Koskinen et al.

(10) Patent No.: US 9,497,131 B2
(45) Date of Patent: Nov. 15, 2016

(54) RADIO LINK CONTROL

(75) Inventors: Henri Markus Koskinen, Espoo (FI); Jussi Matti Sipola, Helsinki (FI)

(73) Assignee: Nokia Solutions and Networks Oy, Espoo (FI)

( * ) Notice: Subject to any disclaimer, the term of this patent is extended or adjusted under 35 U.S.C. 154(b) by 163 days.

(21) Appl. No.: 13/985,975

(22) PCT Filed: Feb. 16, 2011

(86) PCT No.: PCT/EP2011/052254
§ 371 (c)(1),
(2), (4) Date: Sep. 9, 2013

(87) PCT Pub. No.: WO2012/110084
PCT Pub. Date: Aug. 23, 2012

(65) Prior Publication Data
US 2014/0003378 A1    Jan. 2, 2014

(51) Int. Cl.
*H04W 80/02* (2009.01)
*H04L 12/801* (2013.01)
*H04W 28/06* (2009.01)
*H04L 5/00* (2006.01)

(52) U.S. Cl.
CPC ............ *H04L 47/34* (2013.01); *H04L 5/0044* (2013.01); *H04W 28/065* (2013.01)

(58) Field of Classification Search
None
See application file for complete search history.

(56) References Cited

U.S. PATENT DOCUMENTS

| | | | |
|---|---|---|---|
| 2007/0177608 A1* | 8/2007 | Ding | H04L 69/22 370/395.6 |
| 2008/0076359 A1* | 3/2008 | Charpentier | H04L 12/1868 455/63.1 |
| 2011/0032877 A1* | 2/2011 | Pani et al. | 370/328 |
| 2011/0041024 A1* | 2/2011 | Burbidge | H04L 1/1621 714/749 |
| 2011/0110263 A1* | 5/2011 | Yi | H04L 1/1642 370/252 |
| 2011/0164664 A1* | 7/2011 | Torsner et al. | 375/219 |
| 2013/0010964 A1* | 1/2013 | Fong et al. | 380/277 |
| 2013/0176988 A1* | 7/2013 | Wang et al. | 370/331 |

FOREIGN PATENT DOCUMENTS

| WO | WO 2010/036154 A1 | 4/2010 |
|---|---|---|
| WO | WO 2011/019204 A2 | 2/2011 |

OTHER PUBLICATIONS

3GPP TS 36.322 V10.0.0 (Dec. 2010), "$3^{rd}$ Generation Partnership Project; Technical specification Group Radio Access Network; Evolved Universal Terrestrial Radio Access (E-UTRA); Radio Link Control (RLC) protocol specification (Release 10)", 39 pgs.

* cited by examiner

*Primary Examiner* — Duc Duong
(74) *Attorney, Agent, or Firm* — Harrington & Smith

(57) ABSTRACT

The invention relates to apparatuses, methods, a system, computer programs, computer program products and computer-readable media.

20 Claims, 2 Drawing Sheets

RADIO LINK CONTROL

FIELD

Figure 1:
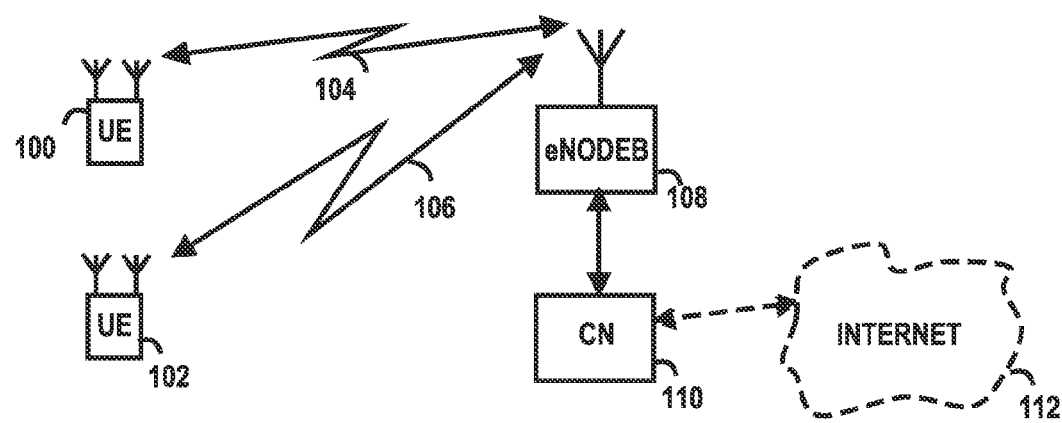

The invention relates to apparatuses, methods, a system, computer programs, computer program products and computer-readable media.

BACKGROUND

The following description of background art may include insights, discoveries, understandings or disclosures, or associations together with disclosures not known to the relevant art prior to the present invention but provided by the invention. Some such contributions of the invention may be specifically pointed out below, whereas other such contributions of the invention will be apparent from their context. In communication systems, latency control is one of key issues in achieving the best possible operation.

BRIEF DESCRIPTION

According to an aspect of the present invention, there is provided an apparatus comprising: at least one processor and at least one memory including a computer program code, the at least one memory and the computer program code configured to, with the at least one processor, cause the apparatus at least to: assign data to at least one data unit and set a sequence number to the at least one data unit; form a plurality of segments from the at least one data unit, each one of the plurality of segments having the set sequence number as its sequence number, and convey the plurality of segments and the sequence numbers to a target entity as an earliest data conveyance by using at least one component carrier.

According to yet another aspect of the present invention, there is provided a method comprising: assigning data to at least one data unit and set a sequence number to the at least one data unit; forming a plurality of segments from the at least one data unit, each one of the plurality of segments having the set sequence number as its sequence number, and conveying the plurality of segments and the sequence numbers to a target entity as an earliest data conveyance by using at least one component carrier.

According to yet another aspect of the present invention, there is provided an apparatus comprising: means for assigning data to at least one data unit and set a sequence number to the at least one data unit; means for forming a plurality of segments from the at least one data unit, each one of the plurality of segments having the set sequence number as its sequence number, and means for conveying the plurality of segments and the sequence numbers to a target entity as an earliest data conveyance by using at least one component carrier.

According to yet another aspect of the present invention, there is provided a computer program embodied on a computer-readable storage medium, the computer program comprising program code for controlling a process to execute a process, the process comprising: assigning data to at least one data unit and set a sequence number to the at least one data unit; forming a plurality of segments from the at least one data unit, each one of the plurality of segments having the set sequence number as its sequence number, and conveying the plurality of segments and the sequence numbers to a target entity as an earliest data conveyance by using at least one component carrier.

LIST OF DRAWINGS

Figure 3:
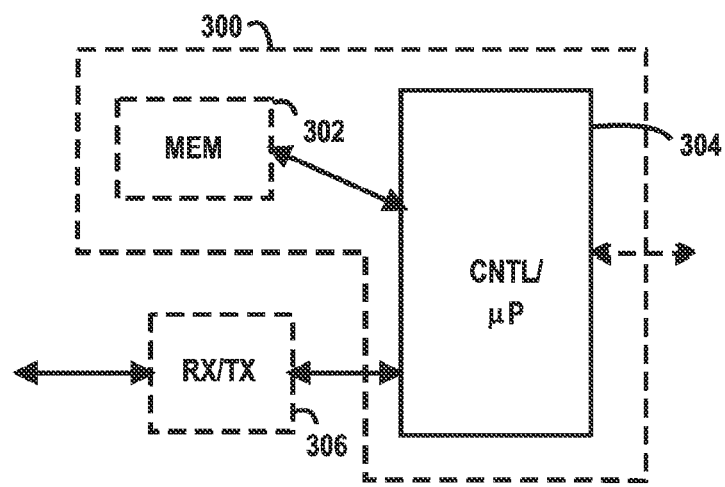
Figure 2:
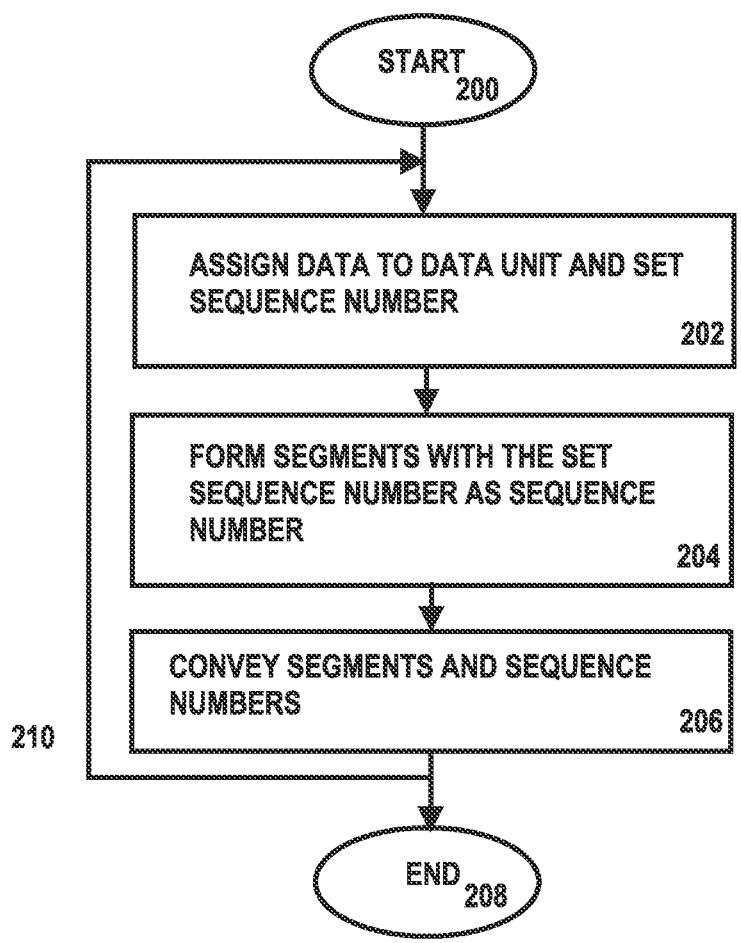

Some embodiments of the present invention are described below, by way of example only, with reference to the accompanying drawings, in which FIG. 1 illustrates an example of a system;
FIG. 2 is a flow chart, and
FIG. 3 illustrates examples of an apparatus.

DESCRIPTION OF EMBODIMENTS

The following embodiments are only examples. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

Embodiments are applicable to any user device, such as a user terminal, relay node, server, node, corresponding component, and/or to any communication system or any combination of different communication systems that support required functionalities. The communication system may be a wireless communication system or a communication system utilizing both fixed networks and wireless networks. The protocols used, the specifications of communication systems, apparatuses, such as servers and user terminals, especially in wireless communication, develop rapidly. Such development may require extra changes to an embodiment. Therefore, all words and expressions should be interpreted broadly and they are intended to illustrate, not to restrict, embodiments.

In the following, different exemplifying embodiments will be described using, as an example of an access architecture to which the embodiments may be applied, a radio access architecture based on LTE Advanced, LTE-A, that is based on orthogonal frequency multiplexed access (OFDMA) in a downlink and a single-carrier frequency-division multiple access (SC-FDMA) in an uplink, without restricting the embodiments to such an architecture, however. It is obvious for a person skilled in the art that the embodiments may also be applied to other kinds of communications networks having suitable means by adjusting parameters and procedures appropriately. For example, the embodiments are applicable to both frequency division duplex (FDD) and time division duplex (TDD).

In an orthogonal frequency division multiplexing (OFDM) system, the available spectrum is divided into multiple orthogonal sub-carriers. In OFDM systems, available bandwidth is divided into narrower sub-carriers and data is transmitted in parallel streams. Each OFDM symbol is a linear combination of signals on each of the subcarriers. Further, each OFDM symbol is preceded by a cyclic prefix (CP), which is used to decrease Inter-Symbol Interference. Unlike in OFDM, SC-FDMA subcarriers are not independently modulated.

Typically, a (e)NodeB ("e" stands for evolved) needs to know channel quality of each user device and/or the preferred precoding matrices (and/or other multiple input-multiple output (MIMO) specific feedback information, such as channel quantization) over the allocated sub-bands to schedule transmissions to user devices. Required information is usually signalled to the (e)NodeB.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with the necessary properties. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS).

FIG. 1 shows a part of a radio access network of E-UTRA, LTE, LTE-Advanced (LTE-A) or LTE/EPC (EPC=evolved packet core, EPC is enhancement of packet switched technology to cope with faster data rates and growth of Internet protocol traffic). E-UTRA is an air interface of Release 8 (UTRA=UMTS terrestrial radio access, UMTS=universal mobile telecommunications system). Some advantages obtainable by LTE (or E-UTRA) are a possibility to use plug and play devices, and Frequency Division Duplex (FDD) and Time Division Duplex (TDD) in the same platform.

FIG. 1 shows user devices 100 and 102 configured to be in a wireless connection on one or more communication channels 104, 106 in a cell with a (e)NodeB 108 providing the cell. The physical link from a user device to a (e)NodeB is called uplink or reverse link and the physical link from the NodeB to the user device is called downlink or forward link.

The NodeB, or advanced evolved node B (eNodeB, eNB) in LTE-Advanced, is a computing device configured to control the radio resources of communication system it is coupled to. The (e)NodeB may also be referred to a base station, an access point or any other type of interfacing device including a relay station capable of operating in a wireless environment.

The (e)NodeB includes transceivers, for entity. From the transceivers of the (e)NodeB, a connection is provided to an antenna unit that establishes bi-directional radio links to user devices. The antenna unit may comprise a plurality of antennas or antenna elements. The (e)NodeB is further connected to core network 110 (CN). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc.

A communications system typically comprises more than one (e)NodeB in which case the (e)NodeBs may also be configured to communicate with one another over links, wired or wireless, designed for the purpose. These links may be used for signalling purposes.

The communication system is also able to communicate with other networks, such as a public switched telephone network or the Internet 112.

The user device (also called UE, user equipment, user terminal, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device.

The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

It should be understood that, in FIG. 1, user devices are depicted to include 2 antennas only for the sake of clarity. The number of reception and/or transmission antennas may naturally vary according to a current implementation. Further, although the apparatuses have been depicted as single entities, different units, processors and/or memory units (not all shown in FIG. 1A) may be implemented.

It is obvious for a person skilled in the art that the depicted system is only an example of a part of a radio access system and in practise, the system may comprise a plurality of (e)NodeBs, the user device may have an access to a plurality of radio cells and the system may comprise also other apparatuses, such as physical layer relay nodes or other network elements, etc. At least one of the NodeBs or eNodeBs may be a Home(e)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometres, or smaller cells such as micro-, femto- or picocells. The (e)NodeB 108 of FIG. 1 may provide any kind of these cells. A cellular radio system may be implemented as a multilayer network including several kinds of cells. Typically, in multilayer networks, one node B provides one kind of a cell or cells, and thus a plurality of node Bs are required to provide such a network structure.

The LTE-Advanced is targeted to provide even higher peak-data rates than the LTE. These are achievable with an increase of transmission bandwidth. The transmission bandwidth can be increased while simultaneously maintaining the spectral compatibility with LTE devices (an LTE-Advanced capable network is designed to appear as an LTE network for an LTE user device) by carrier aggregation, wherein multiple LTE component carriers (typically LTE Release 8 carriers) are aggregated on a medium access control (MAC) layer to provide required bandwidth. The aggregation of component carriers may be carried out at different protocol layers. An LTE user device sees each component carrier as an LTE carrier, whereas an LTE-Advanced user device is able to exploit the aggregated bandwidth as a whole. LTE user devices receive or transmit on one component carrier, whereas LTE-advanced user devices may receive or transmit on multiple component carriers simultaneously to reach higher bandwidths. When carrier aggregation is used, a single radio link control (RLC) protocol entity is usually used per a user device instead of carrier-specific RLC protocol entities.

A Release 8 transmission chain on a physical layer typically consists of segmentation of transport blocks obtained from higher layers (Media Access Control, MAC) into code blocks, turbo coding of each code block and attaching a Cyclic Redundancy Check to the codes blocks and transport blocks, modulating, layer mapping for diversity transmission or spatial multiplexing, and pre-coding and mapping onto physical resource blocks.

The Long Term Evolution (LTE) Layer 2 user-plane protocol stack generally comprises three sub-layers: the packet data convergence protocol (PDCP) layer, the radio link control (RLC) layer, and the medium access control (MAC) layer. Usually, the PDCP layer (on the top of the protocol stack) processes radio resource control (RRC) messages on the control plane and Internet Protocol (IP) packets on the user plane. Depending on the type of a radio bearer, main functions of the PDCP layer may be header compression, security, and support for reordering and retransmission during handover.

Typically, the RLC layer (a middle layer of the protocol stack) provides segmentation and/or reassembly of upper layer packets in order to adapt them to a size suitable for radio interface. The RLC layer may also carry out retransmission in the case of packet losses. Additionally, the RLC layer may carry out reordering to compensate for out-of-order reception due to hybrid automatic repeat request (HARQ) operation in the media access control (MAC) layer.

The MAC layer (bottom one of the protocol stack) is designed to carry out multiplexing of data from different radio bearers.

For data transmission, the RLC layer may receive packets from the packet data convergence protocol (PDCP) layer. These packets are typically called PDCP protocol data units (PDUs) when considered from the PDCP layer's perspective and represent RLC service data units (SDUs) from the RLC layer's point of view. The RLC layer may provide suitable packets to the layer below which typically is the MAC layer. The packets the RLC provides the MAC layer with are RLC PDUs when considered from the RLC layer's side and MAC SDUs from the MAC layer's point of view.

The RLC layer may process SDUs in a plurality of ways: it may produce one PDU of a plurality of SDUs or it may carry out segmentation that is "split" an SDU in such a manner that different parts of an SDU end up in different PDUs.

In this application, an entity providing services of the RLC layer is called an RLC entity or a logical RLC entity. An embodiment relates to radio link control (RLC) protocol in E-UTRAN [3GPP TS 36.322].

Typically, the RLC layer provides segmentation and/or concatenation of upper layer packets in order to adapt them to a size suitable for the size of a MAC service data unit (SDU) which in turn depends on the size of a current transport block of a physical layer. For carrying out retransmission, a resegmentation may be needed, since the transport block size and/or MAC SDU size may have been changed.

Usually, the RLC protocol presents two PDU formats for the transfer of higher-layer data, such as RLC service data units (SDUs): an acknowledged mode data (AMD) protocol data unit (PDU) and an AMD PDU segment. In the protocol, an AMD PDU is used to transfer upper layer PDUs by an acknowledged mode (AM) RLC entity. It is used when the AM RLC entity transmits (at least a part of) the RLC SDU for the first time, or when the AM RLC entity retransmits an AMD PDU without performing re-segmentation. An AMD PDU segment is used to transfer upper layer PDUs by an AM RLC entity. It is used when the AM RLC entity needs to retransmit a portion of an AMD PDU. Thus, AMD PDU segments are typically formed by resegmentation of parts of an original AMD PDU needed for retransmission. On the MAC layer, these AMD PDU segments are seen as MAC SDUs of which the MAC layer forms one or more MAC PDUs the size of which is determined based on the size of a transport block on a physical layer.

In the following, some embodiments are disclosed in further details in relation to FIG. 2. The embodiment of FIG. 2 is usually related to a base station, node, host, server and/or user device. The embodiment starts in block 200. An embodiment is especially suitable for carrying out preassignment of higher-layer data to a component carrier without knowing beforehand the size of MAC PDUs or other corresponding data units that are going to be scheduled.

In block 202, data is assigned to at least one data unit and a sequence number is set to the at least one data unit.

Data units may be protocol data units (PDUs). In a layered communication system, such as a system based on open system interconnection (OSI) model, a data unit is usually specified in a protocol of a layer in question.

The Long Term Evolution (LTE), which is herein used as an example of a communication system, Layer 2 user-plane protocol stack generally comprises three sub-layers: a packet data convergence protocol (PDCP) layer, a radio link control (RLC) layer, and a medium access control (MAC) layer. Data packets are typically called PDCP protocol data units (PDUs) when considered from the PDCP layer's perspective and represent RLC service data units (SDUs) from the RLC layer's point of view. A PDCP PDU and/or RLC SDU are examples of data units in a general case.

Assigning data to one or more data units may be carried out by using RLC concatenation and segmentation mechanisms defined in the 3rd generation partnership project (3GPP) specification, when a data unit typically corresponds to an RLC acknowledged mode data (AMD) protocol data unit (PDU). However, it should be understood that an RLC AMD PDU may not directly be conveyed as a MAC SDU.

Typically, every data unit to be conveyed is given a sequence number. If each data unit is individually sequence numbered, each of them may be acknowledged individually. Sequence number space is typically limited and the sequence numbers are reused. However, the sequence number space is usually defined to be large enough that the reusing does not cause acknowledgement errors.

Even though the size of a data unit is typically chosen taking into account the size of a MAC SDU, it is possible that the size of a data unit is chosen to be larger than the typical size of a MAC SDU requested by a MAC layer. In this manner it is possible to reduce the propagation rate of an RLC window. Yet another option is that the size of the data unit is set without taking into account the size of a MAC SDU. In block 204, a plurality of segments are formed from the at least one data unit, each one of the plurality of segments having the set sequence number as its sequence number.

In an embodiment, a data unit is given a sequence number which is then also given to segments which are formed from this data unit. Segments formed from another data unit have the sequence number of that data unit. In this manner, segments of a data unit may be linked to this "original" data unit.

Forming at least one data unit into segments may be carried out by using RLC resegmentation mechanism defined in the 3GPP specification to construct one or more data unit segments, in which case a segment is or is correspondent to an RLC AMD PDU segment. Segment size may be based on the size of a service data unit (SDU) requested by a medium access control (MAC) layer. Segments may be produced one at a time and data possibly remained from a data unit may be saved for a following segment to be formed for a following MAC SDU.

An RLC layer may process SDUs in a plurality of ways: it may produce one PDU of a plurality of SDUs or it may carry out segmentation that is "split" an SDU in such a manner that different parts of an SDU end up in different PDUs. This processing may be carried out by a master logical RLC entity or by a slave logical RLC entity, if such a division is applied.

At least one data unit, such as a PDU, may be formed into segments carried by RLC AMD PDU segments, such that the segments forming the at least one AMD PDU and hence having the same sequence number may also be transmitted on different frequency carriers.

In carrier aggregation, for determining the range of a sequence number, it has to be considered how the possibility of a need of a transmitting RLC entity to stop transmission for waiting for acknowledgements of PDUs from a receiving entity may be minimized. It should be understood, that the maximum rate of RLC sequence numbering progressing may be divided by the number of carriers. The maximizing of the size of chosen data units usually minimizes the rate of a RLC sequence number (SN) space usage. Thus, a possibility to improve the usage of a sequence number space is provided. This may be a motivation for the use of RLC AMD PDU segments also for initial transmissions.

If segments carried by AMD PDU segments are used, in maximizing the size of data units, the limiting factor becomes a segment offset (SO) field. A segment offset (SO) field indicates the position of the AMD PDU segment in bytes within the original AMD PDU. Specifically, the SO field indicates the position within the data field of the original AMD PDU to which the first byte of the data field of the AMD PDU segment corresponds to.

An RLC reordering timer may be used at a receiving RLC entity to indicate that MAC-layer retransmissions of an RLC PDU are completed. In one embodiment, an initial transmission of a data unit may span several carriers but only within one subframe, i.e. an initial transmission of a data unit may only be segmented in frequency but not in time.

If an initial transmission of a data unit is segmented also in time, a safety margin in the configuration of the expiry value of RLC reordering timer may be applied possibly combined with scheduling restrictions, such as giving a higher priority for transmissions of the rest of the segments of a data unit of which one or more segments have already been transmitted and/or giving an upper limit for an allowable time between transmissions of segments having a same sequence number that is to say belonging to a same data unit. Another option is that time-segmentation is prohibited only in the uplink, because a user device typically has no control over scheduling.

Additionally, downlink RLC AMD PDU segments may be constructed when the transport block size has been determined by packet scheduling and link adaptation functionalities In block 206, the plurality of segments and the sequence numbers are conveyed to a target entity as an earliest data conveyance by using at least one component carrier.

In one embodiment, segments formed from one data unit are conveyed by using one component carrier, but different data units and/or segments made of them may be conveyed on different component carriers. In another embodiment, segments formed from one data unit are conveyed at least partly on different component carriers. Segments having the same sequence number may be conveyed on different frequency carriers or during several subframes on one component carrier.

Conveying may mean sending, transmitting or submitting to a lower protocol layer for transmission, for example. In practice, the earliest data conveyance may be carried out as one conveyance event, a sequence of conveyance events or by a plurality of separate conveyance events.

As to physical layer transmission, it should be understood that different segments are typically not conveyed as one physical layer transmission. Separate transmissions are used especially when the segments are transmitted on a same carrier but in different subframes.

At least one segment formed from a data unit, such as an AMD PDU segment adapted for transmission using carrier aggregation, may be conveyed. The earliest data conveyance herein means an original or initial data conveyance, not retransmission.

In an embodiment, more than one component carriers are used and thus carrier aggregation principle may be applied. Carrier aggregation typically means aggregation of multiple component carriers for creating a wider effective bandwidth. Component carriers in different frequency bands may also be aggregated. In the LTE, component carriers can be aggregated to support wider transmission bandwidths up to 100 MHz. Spectrum deployment may be contiguous or non-contiguous.

Typically, a Layer 1 and packet scheduling processing for different carriers is physically distributed in nodes, whereas RLC processing is centralized user device-specifically. Thus latency-critical communication between carrier-specific packet schedulers, a user device-specific RLC protocol entity and carrier-specific Layer 1 processing is typically needed. Thus latency may be even more critical with carrier aggregation.

In carrier aggregation, one component carrier may be a master component carrier and other carriers may be slave carriers. A master logical radio link control (RLC) entity and at least one slave logical radio link control entity may operate on the carriers. When carrier aggregation is used, a master logical radio link control entity usually takes care of one carrier, and slave logical radio link control entities may take care of other carriers used for a same user device. The number of slave logical radio link control entities thus usually depends on the number of component carriers used for carrier aggregation.

In an embodiment, a master logical radio link control entity operating on a master component carrier of a plurality of component carriers and at least one slave logical radio link control entity operating on at least one slave component carrier of the plurality of component carriers are determined. The at least one slave logical radio link control entity stores a data unit until a segment size is determined and carries out forming segments of the data unit. The logical radio link control entities form a radio link control (RLC) entity defined in the 3GPP specification.

A single peer RLC entity is typically visible to each RLC entity in a user device, but physically a network-side entity may be composed of one "master" entity and a number of "slave" entities. The master logical RLC protocol entity may physically be co-located with one (or more) of the carriers used for the user device (typically this would be the primary carrier). The "slave" logical RLC entities in turn may be colocated with other carriers used for the same user device. Term "master entity" typically may mean an entity which at least partly controls "slave entities" allocated to its control.

The "master" logical RLC entity may take care of maintaining the order of RLC SDUs and sequence numbering of RLC acknowledged mode data (AMD) PDUs. An RLC AMD PDU may be constructed by taking one or more SDUs from a transmission buffer, performing segmentation and/or concatenation and adding a header. An AMD PDU is usually used to transfer upper layer PDUs by an acknowledge mode (AM) RLC entity.

For transmitting data on other carriers, a master logical RLC entity may assign a sequence number and convey it together with a data unit including one or more RLC SDUs and/or RLC PDU/SDU segments to a slave logical RLC entity. It should be understood that data units are not immediately sent to a user device, but instead, to the slave logical RLC entity typically located in a node.

On a slave logical entity, the at least one data unit, such as at least one RLC AMD PDU, may be buffered until a packet scheduling decision is made (on a lower level) and the size of a current transport block and the size of a current MAC SDU are known. After that, the slave logical RLC entity may utilize the RLC resegmentation mechanism defined in the 3GPP specification to form at least one segment from the at least one data unit. The segment size typically matches a MAC SDU size requested by a MAC layer. In this case, the segment is an RLC AMD PDU segment. Data possibly remained from a data unit may be saved for a following segment to be formed for a following MAC SDU. Some other options for reorganizing data units also exist, such as producing one output data unit of a plurality of input data units.

In one embodiment, an initial transmission of a data unit may span several carriers but only within one subframe, i.e. an initial transmission of a data unit may only be segmented in frequency but not in time. If a concept of a master and slave RLC logical entity(ies) is utilized, this may require the master logical RLC entity to assign and convey a data unit to the slave logical RLC entity that is to say not only an RLC sequence number but also a segment offset range to be applied to AMD PDU segment(s).

In case a need for retransmission of one or more RLC PDUs or RLC PDU segments based on acknowledgement feedback from a logical RLC entity exists, a plurality of possibilities for retransmission exists. One option is that any RLC (acknowledgement/non-acknowledgement) Ack/Nack feedback (STATUS PDU) is forwarded from a master logical RLC entity to the same slave logical RLC entity that made the original transmission and the slave logical RLC entity carries out required retransmissions.

Another possibility is that a master logical RLC entity processes an RLC Ack/Nack feedback received from a user device and conveys the request for retransmissions to any slave logical RLC entity that is to say not necessarily the same that was responsible for the original transmission.

Yet another option is that the master logical RLC entity itself performs RLC retransmission using its own carrier.

It is also possible to use different combinations of the options listed above, especially the combination of second and third options.

Additionally, load balancing between carriers may be based on a non-latency critical flow control algorithm and/or the size of a data unit may be fixed or it may be predicted by the aid of a slow adaptation algorithm.

The embodiment ends in block 208. The embodiment is repeatable in many ways. One example is shown by arrow 210 in FIG. 2.

The steps/points, signaling messages and related functions described above in FIG. 2 are in no absolute chronological order, and some of the steps/points may be performed simultaneously or in an order differing from the given one. Other functions can also be executed between the steps/points or within the steps/points and other signaling messages sent between the illustrated messages. Some of the steps/points or part of the steps/points can also be left out or replaced by a corresponding step/point or part of the step/point.

It should be understood that conveying, transmitting and/or receiving may herein mean preparing a data conveyance, transmission and/or reception, preparing a message to be conveyed, transmitted and/or received, or physical transmission and/or reception itself, etc on a case by case basis.

An embodiment provides an apparatus which may be any node, host, server, user device or any other suitable apparatus capable to carry our processes described above in relation to FIG. 2.

FIG. 3 illustrates a simplified block diagram of an apparatus according to an embodiment especially suitable for radio link control.

As an example of an apparatus according to an embodiment, it is shown an apparatus 300, such as a node device, host, server or user device, including facilities in a control unit 304 (including one or more processors, for example) to carry out functions of embodiments, such as forming a plurality of segments from the at least one data unit, each one of the plurality of segments having the sequence number if a data unit as its sequence number.

This is depicted in FIG. 3. Block 306 includes parts/units/modules need for reception and transmission, usually called a radio front end, RF-parts, radio parts, etc. Another example of an apparatus 300 may include at least one processor 304 and at least one memory 302 including a computer program code, the at least one memory and the computer program code configured to, with the at least one processor, cause the apparatus at least to: assign data to at least one data unit and set a sequence number to the at least one data unit; form a plurality of segments from the at least one data unit, each one of the plurality of segments having the set sequence number as its sequence number, and convey the plurality of segments and the sequence numbers to a target entity as an earliest data conveyance by using at least one component carrier.

Yet another example of an apparatus comprises means 304 for assigning data to at least one data unit and set a sequence number to the at least one data unit; means 304 for forming a plurality of segments from the at least one data unit, each one of the plurality of segments having the set sequence number as its sequence number, and means 304 for conveying the plurality of segments and the sequence numbers to a target entity as an earliest data conveyance by using at least one component carrier.

Yet another example of an apparatus comprises an assigner configured to assign data to at least one data unit and set a sequence number to the at least one data unit; a forming unit configured to form a plurality of segments from the at least one data unit, each one of the plurality of segments having the set sequence number as its sequence number, and a conveying unit configured to convey the plurality of segments and the sequence numbers to a target entity as an earliest data conveyance by using at least one component carrier. It should be understood that the apparatuses may include or be coupled to other units or modules etc, such as radio parts or radio heads, used in or for transmission and/or reception. This is depicted in FIG. 3 as an optional block 306.

Although the apparatuses have been depicted as one entity in FIG. 3, different modules and memory may be implemented in one or more physical or logical entities.

An apparatus may in general include at least one processor, controller or a unit designed for carrying out control functions operably coupled to at least one memory unit and to various interfaces. Further, the memory units may include volatile and/or non-volatile memory. The memory unit may store computer program code and/or operating systems, information, data, content or the like for the processor to perform operations according to embodiments. Each of the memory units may be a random access memory, hard drive, etc. The memory units may be at least partly removable and/or detachably operationally coupled to the apparatus. The memory may be of any type suitable for the current technical environment and it may be implemented using any suitable data storage technology, such as semiconductor-based technology, flash memory, magnetic and/or optical memory devices. The memory may be fixed or removable.

The apparatus may be a software application, or a module, or a unit configured as arithmetic operation, or as a program (including an added or updated software routine), executed by an operation processor. Programs, also called program products or computer programs, including software routines, applets and macros, can be stored in any apparatus-readable data storage medium and they include program instructions to perform particular tasks. Computer programs may be coded by a programming language, which may be a high-level programming language, such as objective-C, C, C++, Java, etc., or a low-level programming language, such as a machine language, or an assembler.

Modifications and configurations required for implementing functionality of an embodiment may be performed as routines, which may be implemented as added or updated software routines, application circuits (ASIC) and/or programmable circuits. Further, software routines may be downloaded into an apparatus. The apparatus, such as a node device, or a corresponding component, may be configured as a computer or a microprocessor, such as single-chip computer element, or as a chipset, including at least a memory for providing storage capacity used for arithmetic operation and an operation processor for executing the arithmetic operation.

Embodiments provide computer programs embodied on a distribution medium, comprising program instructions which, when loaded into electronic apparatuses, constitute the apparatuses as explained above.

Other embodiments provide computer programs embodied on a computer readable medium, configured to control a processor to perform embodiments of the methods described above.

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, electrical carrier signal, telecommunications signal, and software distribution package, for example. Depending on the processing power needed, the computer program may be executed in a single electronic digital computer or it may be distributed amongst a number of computers.

The techniques described herein may be implemented by various means. For example, these techniques may be implemented in hardware (one or more devices), firmware (one or more devices), software (one or more modules), or combinations thereof. For a hardware implementation, the apparatus may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chip set (e.g., procedures, functions, and so on) that perform the functions described herein. The software codes may be stored in a memory unit and executed by processors. The memory unit may be implemented within the processor or externally to the processor. In the latter case it can be communicatively coupled to the processor via various means, as is known in the art. Additionally, the components of systems described herein may be rearranged and/or complimented by additional components in order to facilitate achieving the various aspects, etc., described with regard thereto, and they are not limited to the precise configurations set forth in the given figures, as will be appreciated by one skilled in the art.

It will be obvious to a person skilled in the art that, as technology advances, the inventive concept may be implemented in various ways. The invention and its embodiments are not limited to the examples described above but may vary within the scope of the claims.

The invention claimed is:

1. An apparatus comprising:
at least one processor and at least one memory including a computer program code, the at least one memory and the computer program code configured to, with the at least one processor, cause the apparatus at least to:
assign data to at least one data unit and set a sequence number to the at least one data unit;
form a plurality of segments from the at least one data unit, each one of the plurality of segments having the set sequence number as its sequence number,
convey the plurality of segments and the sequence numbers to a target entity as an earliest data conveyance by using at least one component carrier; and
determine a master logical radio link control entity operating on a master component carrier of a plurality of component carriers and at least one slave logical radio link control entity operating on at least one slave component carrier of the plurality of component carriers, wherein the at least one slave logical radio link control entity is configured to store the at least one data unit until a segment size is selected and thereafter to form the plurality of segments.

2. The apparatus of claim 1, wherein the forming a plurality of segments is based on acknowledged mode data (AMD) protocol data unit (PDU) resegmentation.

3. The apparatus of claim 2, wherein radio link control (RLC) acknowledged mode data (AMD) protocol data unit (PDU) segments having a same sequence number are conveyed on different frequency carriers.

4. The apparatus of claim 3, wherein the radio link control (RLC) acknowledged mode data (AMD) protocol data unit (PDU) segments having the same sequence number are conveyed during one subframe.

5. The apparatus of claim 2, wherein radio link control (RLC) acknowledged mode data (AMD) protocol data unit (PDU) segments having a same sequence number are conveyed during several subframes on one component carrier.

6. The apparatus of claim 1, wherein the logical radio link control entities form a radio link control (RLC) entity defined in the 3rd generation partnership project (3GPP) specification.

7. The apparatus of claim 1, the apparatus comprising a server, host, node or user device.

8. The apparatus of claim 1, further configured to select the segment size based on a service data unit (SDU) size requested by a medium access control (MAC) layer.

9. A method comprising:
assigning data to at least one data unit and setting a sequence number to the at least one data unit;
forming a plurality of segments from the at least one data unit, each one of the plurality of segments having the set sequence number as its sequence number,
conveying the plurality of segments and the sequence numbers to a target entity as an earliest data conveyance by using at least one component carrier; and
determining a master logical radio link control entity operating on a master component carrier of a plurality of component carriers and at least one slave logical radio link control entity operating on at least one slave component carrier of the plurality of component carriers, wherein the at least one slave logical radio link control entity stores the at least one data unit until a segment size is selected and thereafter forming the plurality of segments.

10. The method of claim 9, wherein the forming a plurality of segments is based on acknowledged mode data (AMD) protocol data unit (PDU) resegmentation.

11. The method of claim 10, further comprising:
conveying radio link control (RLC) acknowledged mode data (AMD) protocol data unit (PDU) segments having a same sequence number on different frequency carriers.

12. The method of claim 11, further comprising:
conveying the radio link control (RLC) acknowledged mode data (AMD) protocol data unit (PDU) segments having the same sequence number during one subframe.

13. The method of claim 10, further comprising: conveying radio link control (RLC) acknowledged mode data (AMD) protocol data unit (PDU) segments having a same sequence number during several subframes on one component carrier.

14. The method of claim 9, wherein the logical radio link control entities form a radio link control (RLC) entity defined in the 3rd generation partnership project (3GPP) specification.

15. An apparatus comprising means for carrying out the method according to claim 9.

16. The method according to claim 9, further comprising selecting a segment size based on a service data unit (SDU) size requested by a medium access control (MAC) layer.

17. At least one memory unit tangibly storing a computer program, the computer program comprising program code for controlling a process comprising:
assigning data to at least one data unit and set a sequence number to the at least one data unit;
forming a plurality of segments from the at least one data unit, each one of the plurality of segments having the set sequence number as its sequence number,
conveying the plurality of segments and the sequence numbers to a target entity as an earliest data conveyance by using at least one component carrier; and
determining a master logical radio link control entity operating on a master component carrier of a plurality of component carriers and at least one slave logical radio link control entity operating on at least one slave component carrier of the plurality of component carriers, wherein the at least one slave logical radio link control entity stores the at least one data unit until the segment size is selected and thereafter forming the plurality of segments.

18. The at least one memory unit of claim 17, wherein forming the plurality of segments is based on acknowledged mode data (AMD) protocol data unit (PDU) resegmentation.

19. The at least one memory unit of claim 18, wherein conveying the plurality of segments comprises conveying radio link control (RLC) acknowledged mode data (AMD) protocol data unit (PDU) segments having a same sequence number either:
on different frequency carriers during one subframe, or
during several subframes on one component carrier.

20. The at least one memory unit of claim 17, the process further comprising selecting a segment size based on a service data unit (SDU) size requested by a medium access control (MAC) layer.

* * * * *